US011435878B2

(12) United States Patent
Schulman et al.

(10) Patent No.: US 11,435,878 B2
(45) Date of Patent: Sep. 6, 2022

(54) SENTENCE BUILDER SYSTEM AND METHOD

(71) Applicant: Cava Holding Company, Washington, DC (US)

(72) Inventors: Brett Schulman, Washington, DC (US); Ariana Kamar, Washington, DC (US); Brandon Ehrgood, Washington, DC (US)

(73) Assignee: CAVA HOLDING COMPANY, Washington, DC (US)

( * ) Notice: Subject to any disclaimer, the term of this patent is extended or adjusted under 35 U.S.C. 154(b) by 0 days.

(21) Appl. No.: 17/543,300

(22) Filed: Dec. 6, 2021

(65) Prior Publication Data

US 2022/0179527 A1 Jun. 9, 2022

Related U.S. Application Data

(60) Provisional application No. 63/121,430, filed on Dec. 4, 2020.

(51) Int. Cl.
*G06F 3/0482* (2013.01)
*G06F 3/04817* (2022.01)
*G06F 9/451* (2018.01)
*G06F 9/54* (2006.01)

(52) U.S. Cl.
CPC ........ *G06F 3/0482* (2013.01); *G06F 3/04817* (2013.01); *G06F 9/451* (2018.02); *G06F 9/541* (2013.01)

(58) Field of Classification Search
CPC .... G06F 3/0482; G06F 3/04817; G06F 9/451; G06F 9/541
See application file for complete search history.

(56) References Cited

U.S. PATENT DOCUMENTS

| | | | |
|---|---|---|---|
| 10,885,575 B2* | 1/2021 | Grogan | G06F 3/0482 |
| 2014/0282265 A1* | 9/2014 | Shaich | G06F 3/0482 |
| | | | 715/841 |
| 2018/0130094 A1* | 5/2018 | Tung | G06F 3/04886 |
| 2020/0410421 A1* | 12/2020 | Nelson | G06Q 10/06312 |

OTHER PUBLICATIONS

Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

* cited by examiner

*Primary Examiner* — Mong-Shune Chung
(74) *Attorney, Agent, or Firm* — Greenberg Traurig LLP; Mammen ("Roy") P. Zachariah, Jr.

(57) ABSTRACT

The disclosed technology generally relates to an application programming interface (API) and user interface (UI) that can translate user communication into an interactive message that is displayed on the UI. In at least one embodiment, a mobile application uses a sentence builder to translate data structures into an interactive message (e.g., an editable sentence). A UI can display the interactive message in a first portion (e.g., "upper portion") of a UI, and display user selectable objects for adding information to the interactive message in a second portion (e.g., "lower portion"). For example, as a customer makes choices for a food order, ingredients as emojis can appear and disappear in sentence form from a UI based on customer preferences and inputs.

21 Claims, 11 Drawing Sheets

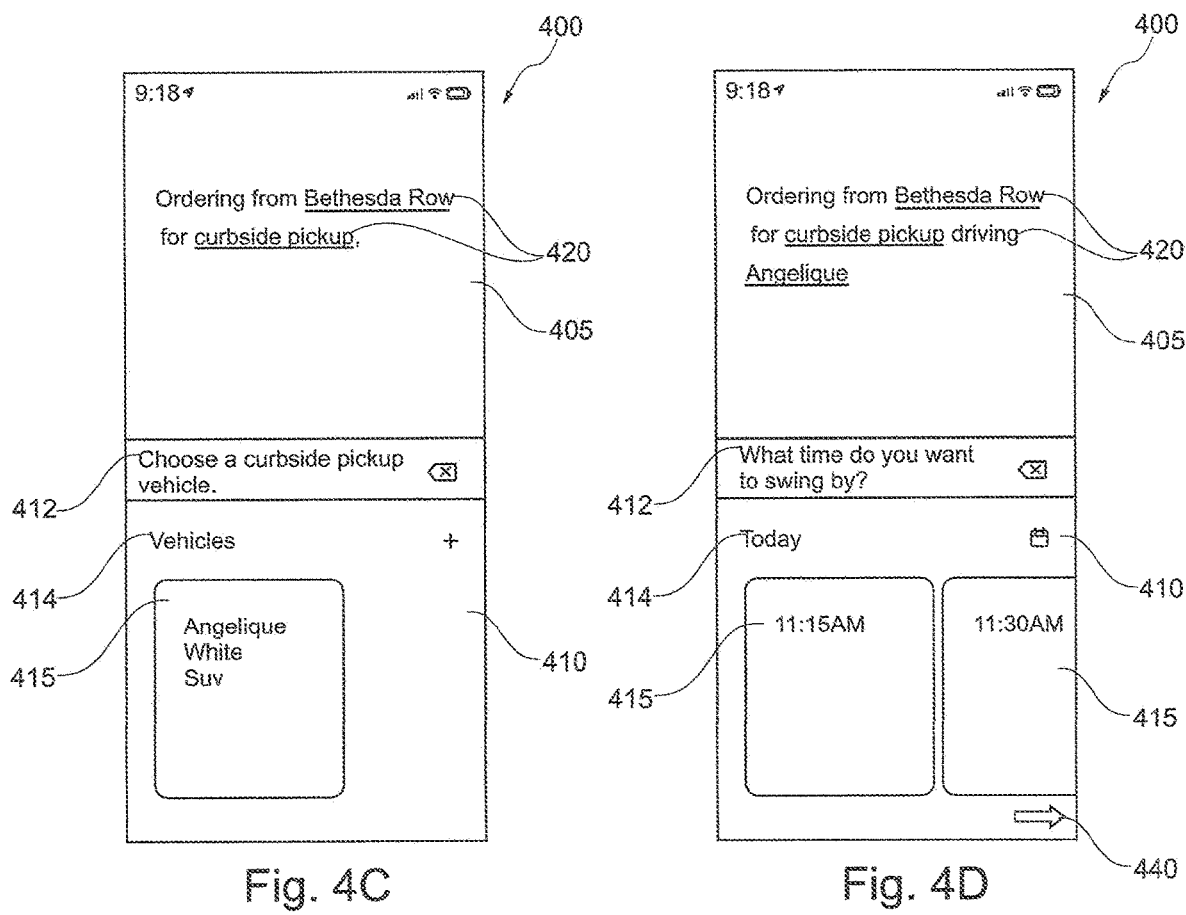

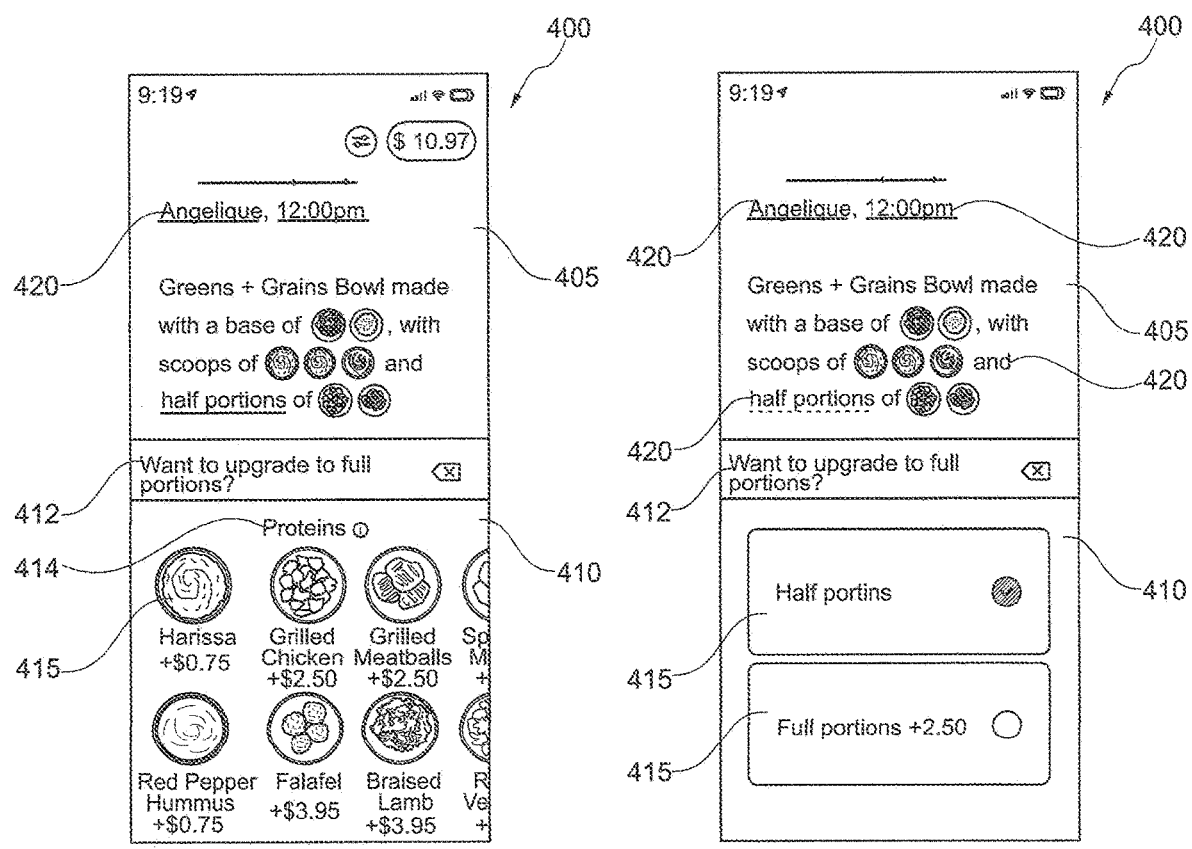

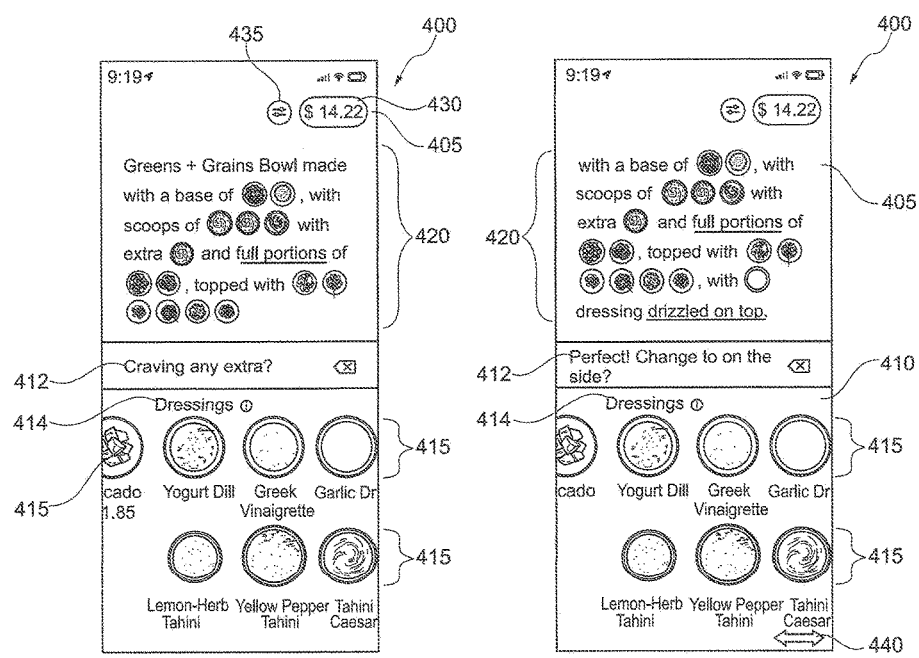

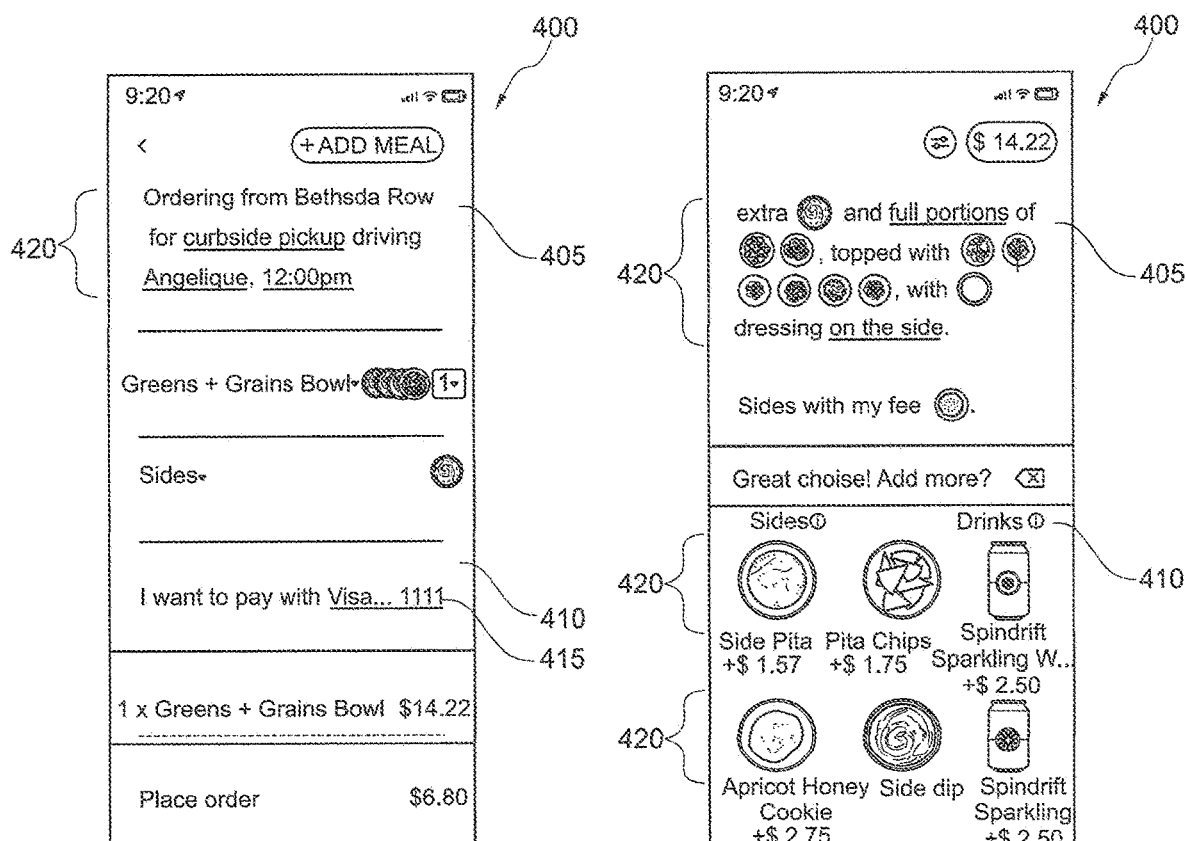

SENTENCE BUILDER SYSTEM AND METHOD

CROSS-REFERENCES TO RELATED APPLICATION

This application claims the benefit of U.S. Provisional Application Ser. No. 63/121,430, filed on Dec. 4, 2020, titled "SENTENCE BUILDER SYSTEM AND METHOD," which is incorporated herein by reference in its entirety.

TECHNICAL FIELD

The disclosed technology generally relates to an application programming interface (API) that can translate user communication into an interactive message (e.g., editable sentence) and a user interface (UI) that can communicate with that API to display the interactive message.

BACKGROUND

Food providers such as corporations and restaurant owners have many customers who want to place a food or drink order using a mobile device. To meet this desire, food providers can provide a menu and food ordering service on a mobile application through the Internet. A customer can download a mobile application for a food provider on their mobile device, and then use that mobile application to place orders. For example, a food provider offers a mobile application that allows a customer to order and pay for a burrito using their mobile device. After placing an order on a mobile application, customers can go to the food provider's location (e.g., restaurant) to pick up an order. Alternatively, a food provider can deliver an order to the user's location.

While mobile applications available today provide an ability to order food and pay for food, the mobile applications lack a UI that is effective for ordering food. For example, mobile applications often provide a UI that is not intuitive to a user because the menu is too complex, and it is difficult for a user to customize an order. Also, mobile applications currently lack an ability to intuitively provide a user with immediate consequences of their inputs through a UI in a way that a user can easily digest. Accordingly, there exists a need to address these problems and provide additional benefits.

SUMMARY

The disclosed technology includes a computer-implemented method. The computer-implemented method can comprise providing, by an application programming interface (API), a user interface (UI) that includes a first portion and a second portion (e.g., upper and lower portions). The computer-implemented method can further comprise providing, by the API, a first user selectable object (e.g., food item) in the second portion of the UI, and receiving, from the UI, a first user selection of the first user selectable object (e.g., a selection of grains). In response to receiving the first user selection, the computer-implemented method can translate the first user selection into an interactive first message by the API and provide the interactive first message in the first portion of the UI, wherein the interactive first message (e.g., a sentence) includes a first user modifiable object (e.g., an emoji or underlined word in a sentence, where the underlined word indicates that a user can edit the sentence to revise an order).

In at least one embodiment, the interactive first message can be an interactive (e.g., natural language) message including a word, phrase, emoji, or combination of words and emojis that a user can intuitively understand as corresponding to details of the user's order on the mobile application. A user can adjust their order by modifying the interactive message; for example, a user can edit the interactive message by deleting a word, symbol, or emoji from the interactive message and an API can automatically update a food order based on these deletions. In at least one embodiment, content of the first user selectable object is based an initial query for the user (e.g., whether the user wants to place an order) and content of the second user selectable object depends what the user selected for the first user selectable object. The computer-implemented method can include providing, via the UI, a user with several user selectable objects, which result in the user making several selections to build a food order, where options and content of options (e.g., user selectable objects) are presented in a sequential order for logically building a food order (e.g., location, pick-up or delivery, food type, base protein, vegetable, sauces, salt, pepper, and the like). In at least one embodiment, the user sees that first and second interactive messages as a sentence or phrase, which enables the user to easily understand components and parameters (e.g., pick-up or delivery) of their order. More generally, as a user is placing an order with the mobile application, an API is building a sentence corresponding to the user's order.

In response to receiving the first user selection, the computer-implemented method can further comprise providing a second user selectable object in the second portion of the UI; receiving, from the UI, a second user selection of the second user selectable object. In response to receiving the second user selection, the computer-implemented method can translate the second user selection into an interactive second message by the API and providing the interactive first message and the interactive natural second message in the first portion of the UI, wherein the interactive second message includes a second user modifiable object. In at least one embodiment, a first or second user selectable object is presented by a UI in a list of user selectable objects. For example, a first user selectable object is brown rice, and a UI presents the first user selectable object with user selectable objects for a grain such as white rice or quinoa.

The computer-implemented method can further comprise receiving, from the UI, a first user edit (e.g., input to delete or modify a sentence) corresponding to modifying the first user modifiable object or the second user modifiable object; and in response to receiving the first user edit, modifying the first or second interactive messages in the first portion of the UI and modifying a display of the first or second user selectable objects in the second portion of the UI.

The computer-implemented method can be stored in a non-transitory computer-readable medium. The computer-implemented method can be implemented by a mobile device to a place an order for food. The computer-implemented method can include a first API and second API, where the first API and/or the second API are in a single code base.

The disclosed technology also includes a system with components to implement a method for placing an order. For example, a system with components such as a mobile device, a mobile application, a sentence builder, a translator, a first API, and a second API, and application server can be used to implement part or all of the computer-implemented method.

The disclosed technology also includes a system and methods for displaying or printing steps for a food preparer to prepare an order (e.g., where to get ingredients, order for adding ingredients, steps for preparing ingredients such as cooking time and temperature). A system or a method can determine steps for preparing a food order based on a data structure associated with a food provider location, a data structure that includes parameters for an order to add ingredients to an order, ingredient location at a food provider's location, or a trained neural network.

BRIEF DESCRIPTION OF THE FIGURES

FIGS. 4A, 4B, 4C, 4D, 4E, 4F, 4G, 4H, 4I, 4J, 4K, 4L, 4M, 4N, and 4O are example UIs in accordance with at least one embodiment of the disclosed technology.

DETAILED DESCRIPTION

Figure 1:
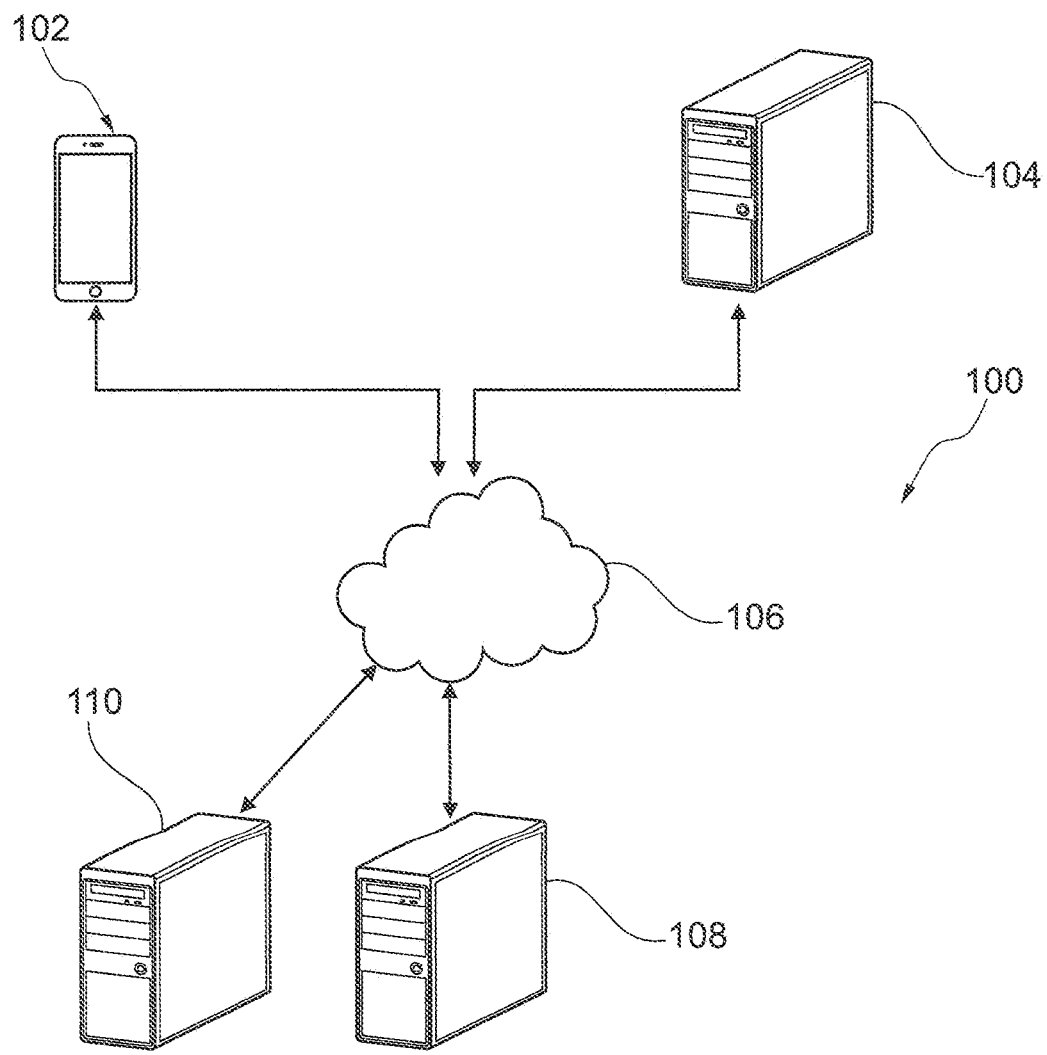
FIG. 1 is an overview block diagram of an ordering environment in accordance with at least one embodiment of the disclosed technology.

Translating computer operations related to placing an order and displaying order information on a UI can be technically challenging. For example, food providers often offer different menus at different locations, which means the UI needs to be dynamically updated based on a user's location or order pick up location and a menu database. Also, a food provider may have a limited and dynamic inventory such that an ingredient for a food order may not be available on short notice, which means options that are available on the UI may not actually be available in the food provider location where a user intends to pick up an order. Also, a user's preferences and dietary limitations can be considered when preparing the order so that the user is satisfied.

Because of the large amount of data that can be required to place an order and the dynamic nature of this data, it can be technically challenging to gather this data, dynamically update this data, and translate this data for an order into a message that a user can intuitively understand on a UI. Accordingly, there is a technical problem related to dynamically updating, merging, and/or presenting data structures in an interactive message in a UI based with limited computational resources.

To address at least this technical problem, the disclosed technology provides a sentence builder and translator for a UI that translate user communication and selections into a natural language message (e.g., sentence). The technical solution can include an API that is in a single code base that dynamically adjusts a UI for a mobile application. Also, the API can include a library of functions and data structures that reduce an amount of time required to dynamically update the UI, merge data structures, present data structures, and modify those data structures.

More specifically, a translator can be a function of libraries that translates user inputs (e.g., edits or selections) related to a data object into a human-readable object (e.g., word, words, emoji, image). A sentence builder can include a library of functions that provide (through API calls) an interactive experience that uses a combination of verbal cues and visual emojis to build an order (e.g., meal). For example, as the mobile application user selects ingredients for their food order, ingredients as emojis can appear and disappear in sentence form, based on user preferences. The sentence builder can be interactive and dynamically updated because it has data objects that can be directly edited in the UI. For example, the interactive sentence builder can enable mobile application users to tap on emoji and underlined elements to edit the meal in various ways. Some of the edits can include one or more of: changing pickup/delivery type, locations, pickup time, deleting or swapping ingredients, switching between half and full portions of protein, switching dressings from on the side to on top, and the like. The sentence experience can also be edited from a final screen of a UI (e.g., checkout bag, shopping cart) as well from within various embodiments.

The sentence builder can be part of a retail ordering application that constructs an interactive message (e.g., natural language sentence that can be edited by the user) based on user input. The sentence builder, in one example, can be constructed from custom components utilizing JavaScript libraries (e.g., React also known as "React.js" or "ReactJS"). In some embodiments, some or all user selections trigger an update to the application's state which may be implemented using a JavaScript state store, or the like. The state store can facilitate action dispatching, data retrieval, modification, and persistence of a JavaScript Object Notation (JSON) data structure representing the user's selections. User input can dispatch a corresponding action, updating the application state JSON data structure, which can keep the application state up to date with the user's current selections and can be utilized by the sentence builder for sentence construction.

In some example embodiments, a top half of the application UI can be configured for display and modification of a sentence containing user selections. The bottom half of the UI can be configured for data selection components. Some or all user selections can be assembled into an editable (e.g., interactive) sentence which the user can interact with by tapping words or emojis to update, modify, or remove items from the sentence, which in turn can update, modify, or remove items from the user's food order. For example, the user can tap a backspace icon, signaling the sentence builder (through an API call) to backspace through the sentence to remove the last item added or currently selected item from the sentence.

In at least one embodiment, the disclosed technology receives an order for an item and provides steps for preparing an order at a food provider location. The steps can be displayed visually on a food provider device, printed on paper, or communicated with audio to a food prepare (e.g., automatically after receiving an order). A computer-implemented method can perform an API to receive an order from a UI, transmit this order to a food provider device, translate the order into steps that are to be performed at a food provider location to make an order, and display or print these steps at a food provider location. For example, after receiving an order from a user, a food provider device displays steps for making a food order such as getting each ingredient in an order that follows an efficient path in a food provider location and it instructs a food preparer on how to prepare ingredients. In such an example, the computer-implemented method determines an efficient path for making a food order based on a data structure that has parameters for where ingredients are located in a food provider location, distances between ingredients, and operations for adding ingredients (e.g., cooking time, temperature for serving).

In at least one embodiment, a computer-implemented method for providing steps for preparing an order at a food provider location includes accessing a trained neural network to determine steps for preparing the order, where the neural network was trained on a dataset that includes a food provider structural layout for ingredients and cookware at the food provider's location, distance between ingredients, conditions to prepare ingredients (e.g., time to cook, time to cut vegetables, availability of cooking devices), and data samples of a food preparer moving in the food provider location and performing steps to prepare an order (e.g., using accelerometers or image data that observes a food preparer). A dataset for training a neural network can include data from a food provider location such as input from a food preparer and machine data for machines used to prepare the food order. A trained neural network can be a convolutional neural network, a recurrent neural network, or a deep neural network.

FIG. 1 is an overview block diagram of an ordering environment 100. FIG. 1 includes a mobile device 102, a food provider device 104, a network 106, a web server 108, and an application server 110. In ordering environment 100, a user can use the mobile device 102 to place an order on the Internet (e.g., through network 106) that is received and processed at the application server 110. To place an order, the mobile device 102 can implement a mobile application and a UI that is described with respect to FIG. 2. Although not shown in FIG. 1, the ordering environment 100 can include authentication servers (e.g., certificates and authorities for granting certificates), servers, databases, or additional infrastructure for providing a food ordering service. Also, although not shown in FIG. 1, the ordering environment 100 can include a monitoring system that monitors activity related to orders from the mobile device 102 and performs machine learning algorithms using trained neural networks to determine data objects and data structures that are preferred by a mobile device user in a menu provided in the UI as part of an ordering process (e.g., food ordering process).

The mobile device 102 can be a mobile phone, laptop, smart watch, or other computing device. The mobile device 102 can communicate with the network 106 to receive and transmit information regarding an order. A customer, user, or entity interested in placing an order for food can use the mobile device 102. The mobile device 102 can provide information about the customer, user, or entity to the application server 110 so that the application server 110 can customize an order (e.g., user profile, location, preferences, credit card information). Alternatively, the application server 110 can communicate with a database to customize an order (e.g., a database storing user profile, location, preferences, credit card information). The mobile device 102 can run a mobile application, which is a software application. The mobile application is described in more detail in FIG. 2.

The food provider device 104 is a computing device that can be located at or near the food provider's location (e.g., restaurant). The food provider device 104 can be a mobile device, server, laptop, database, cloud connected computing device, or tablet that can transmit and send information from the food provider's location (e.g., restaurant, inventory, server) to the network 106. The food provider device 104 can also receive inputs from the food provider's location regarding information related to services, menus, staff, the average wait time at a location, or other location inputs. Through the network 106, the food provider device 104 can receive and transmit information about food orders to other devices (e.g., inventory, store structure, organization of food items in the store). The food provider device 104 can communicate with other devices in the food provider location using a local wireless network (e.g., Wi-Fi or BLUETOOTH). For example, the food provider device 104 can communicate with a network of BLUETOOTH devices to monitor inventory at the food provider location and provide this information to other devices.

A food provider can be an entity that provides or makes food (e.g., a restaurant, a franchise, a chain of restaurants). While a food provider is used as an example in the disclosure, the disclosed technology can be used for other platforms for ordering, buying, or selling items with a mobile device or computing device. Also, ordering a food item is not limited to food, but it can include drinks or other accessories related to the order. Accessories can include utensils (e.g., forks, knifes, spoons, chopsticks), napkins, bags, or other items that a user would prefer with an order (e.g., a drink carrier to hold several drinks).

The network 106 is a network for wireless or wired communication. The network 106 can be a Wi-Fi™ network, a wired network, or a network implementing any of the Institute of Electrical and Electronic Engineers (IEEE) 802.11 standards. The network 106 can be a single network, multiple networks, or multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. In some implementations, the network 106 can include communication networks such as a Global System for Mobile (GSM) mobile communications network, a code/time division multiple access (CDMA/TDMA) mobile communications network, a 3rd, 4th, or 5th generation (3G/4G/5G) mobile communications network (e.g., General Packet Radio Service (GPRS)) or other communications network such as a Wireless Local Area Network (WLAN). In at least one embodiment, the network 106 can be a BLUETOOTH network, where the mobile device 102 can use the BLUETOOTH network individually or in combination with a WLAN network to order food.

The web server 108 can handle requests for various protocols, where the requests can be related to an order, e.g., communication with the application server 110. The web server 108 can handle Hypertext Transfer Protocol (HTTP) protocol. In at least one embodiment, the web server 108 can handle communication related to an order such as a mobile device 102 using a browser or web application to place an order. For example, when the web server 108 receives an HTTP request related to a food order, it responds with an HTTP response, such as sending back a Hypertext Markup Language (HTML) page that can be used to place an order. To process a request, the web server 108 can respond with a static HTML page or image, send a redirect, or delegate the dynamic response generation to some other program such as common gateway interface (CGI) scripts, JavaServer Pages (JSPs), servlets, Active Server Pages (ASPs), server-side JavaScripts, or some other server-side technology.

The application server 110 can handle communication related to a mobile application to order food on the mobile device 102 or communication from the web server 108. The application server 110 can expose business logic (e.g., related to an application for ordering food such as a menu or how food is ordered at a restaurant) to mobile applications through various protocols (e.g., HTTP). The application server 110 can provide access to business logic for use by application programs (e.g., a backend of a mobile application). For example, the application server 110 can provide information to update a UI for a mobile application running on the mobile device 102 or the food provider device 104 (e.g., parameters for data structure in the UI or a response to an API call, where the API call came from the mobile device 102). In at least one embodiment, information is exchanged between the application server 110, the mobile device 102, and the food provider device 104, where the information is related to an order. In at least one embodiment, the application server 110 can expose business logic through an API or multiple APIs. AMAZON WEB SERVES (AWS) can host the application server 110, and AWS can provide access to scalable application servers, storage, databases, content delivery, cache, search, and other application services that build and run mobile applications to order and deliver food (e.g., the mobile application can be run an "EC2" instance or instances hosted by AWS).

Figure 2:
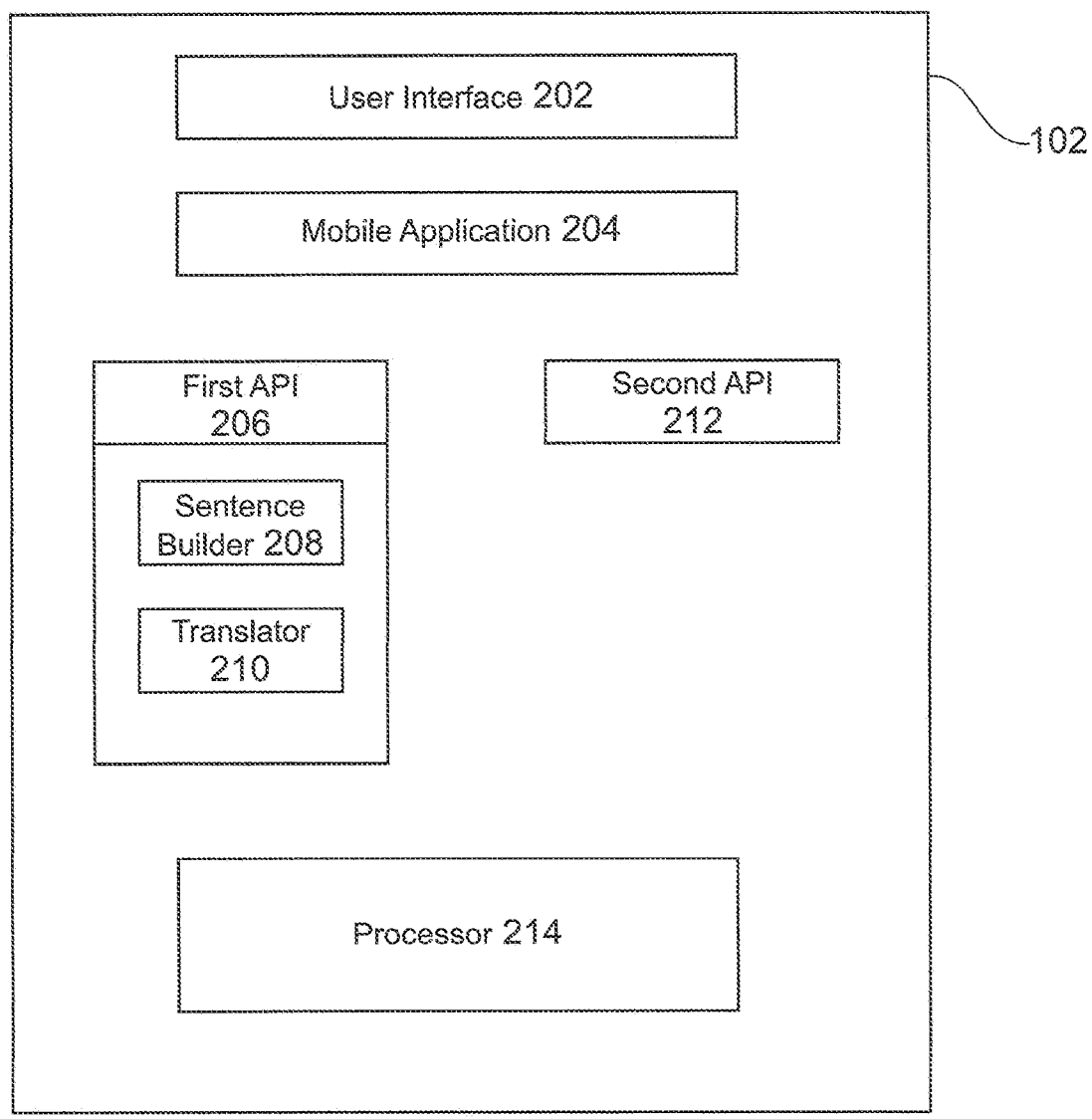
FIG. 2 is a schematic overview block diagram for a mobile device from the ordering environment in FIG. 1 in more detail in accordance with at least one embodiment of the disclosed technology.

FIG. 2 is a schematic overview block diagram for the mobile device 102 from the ordering environment 100 in more detail. FIG. 2 illustrates a mobile application 204, which can be run on the mobile device 102. FIG. 2 also includes a UI 202, first API 206, sentence builder 208, translator 210, second API 212, and a processor 214, where these components can communicate and exchange information. The processor 214 can perform operations (e.g., execute instructions) to implement the mobile application 204, the first API 206, the sentence builder 208, the translator 210, and the second API 212. While not shown in FIG. 2, the mobile device 102 can include additional software or hardware components such as a microphone, speaker, a chipset for wireless communication, a transceiver, an antenna, storage for a user's profile or preferences, virtual reality module, augmented reality module, and a machine learning module to learn information about a user's habits or communicate with a server that is performing machine learning operations. For example, the mobile device 102 can receive user selections via text, voice, or visual gestures.

The UI 202 can be a graphical user interface (GUI) on the mobile device 102 that a user can interface with by pushing, tapping, or otherwise interacting with the UI (e.g., with a finger, hand, etc.). The UI 202 can be displayed on a touchscreen of the mobile device 102. The UI 202 can interface with APIs such as the first API 206 and the second API 212, as well as other APIs not shown in FIG. 2.

The mobile application 204 can include a program or set of functions that are used by the user to place an order. The mobile application 204 can place an order by calling the first API 206 or the second API 212. As part of placing an order, the mobile application 204 can interact with a customer through the UI 202. The mobile application 204 can also provide information to the food provider device 104 through the network 106 (see FIG. 1). For example, if the user requests to add a food item to an order, the mobile application 204 can call the second API 212, which can then access the application server 110, which can then access a database that is tracking the inventory of the food provider's location. The mobile application 204 can receive information about a user such as food preferences or location and push this information through the network 106 to the application server 110 that is running the backend of a food ordering application.

The first API 206 can perform tasks that are requested by the mobile application 204. The mobile application 204 can be an application running on the mobile device 102, and the mobile application 204 can call the first API 206. The first API 206 can access functions and libraries, determine an output for the UI, or perform other APIs to perform tasks to modify the UI 202. For example, the first API 206 can include components utilizing JavaScript libraries (e.g., React also known as "React.js" or "ReactJS").

The first API 206 can provide access to functions such as the sentence builder 208 and the translator 210. The sentence builder 208 can include a library of functions (e.g., accessible by the first API) that can be used to convert a user selection on the UI to a natural language message. The sentence builder 208 can communicate with the translator 210. For example, a user of the mobile device 102 can select an option for grain in a food order using the mobile application 204, which calls the first API 206, and then the first API 206 can call the functions of the sentence builder 208 and translator 210 to translate the selection of a grain into a word message or emoji that a user can understand in their native language such as "grain." In at least one embodiment, the first API 206 can be called when a user edits an interactive message and it can concurrently and automatically revise an order, e.g., including transmitting an updated order to an application server 110 or a food provider device 104.

The second API 212 can also perform tasks that are requested by the mobile application 204. The second API 212 can communicate with the first API 206. For example, a user may request an order that results in the mobile application 204 calling the first API 206 and the second API 212. The second API 212 can be a Representation State Transfer (REST) API. API calls made from the mobile application 204 to the second API 212 can include parameters that are used by functions or databases to perform operations as part of an order. The first API 206 and the second API 212 can communicate or exchange information to perform operations requested by the mobile application 204. The second API can perform menu modification. For example, the second API can perform an API call to determine a menu for a local restaurant (which includes what food is available at the local food provider location, e.g., types of vegetables) or a global menu (e.g., a food provider my offer certain types of food in all locations, e.g., soda or fries).

The first API 206, the sentence builder 208, the translator 210, and the second API 212 can communicate with each other, the webs server 108, the application server 110, and the food provider device 104 to provide the UI 202 with information for placing an order. For example, if "add another meal" is selected on the UI 202, previous meal details are cleared from the sentence builder 208 and a menu item selection component returns to meal type selection, and this information is displayed in the UI 202. As another example, if "Go to Checkout" is selected, the checkout screen is presented on the UI 202. From the checkout screen, the user can see each meal added to the order. The user can tap an "add meal" button to begin adding another meal. The user can also expand the meal item on the checkout screen and tap an "Edit Meal" that will return the user to the sentence builder, reconstructing the sentence of the selected meal, allowing the user to modify or remove items.

The first API 206, the second API 212, the mobile application 204, and the UI 202 can communicate to provide two portions of the UI. In at least one embodiment, the UI 202 has a first portion (e.g., an upper portion) and a second portion ("a lower portion"). The first API 206, the second API 212, the mobile application 204, and the UI 202 can work as a system to receive user input, provide an updated menu, provide an interactive message (e.g., a sentence, natural language message) in a first portion on the UI, and provide user options for updating or modifying the order in the second portion. In some embodiments, some or all user selections trigger an update to the application's state which may be implemented using a JavaScript state store, or the like. The state store can facilitate action dispatching, data retrieval, modification, and persistence of a JavaScript Object Notation (JSON) data structure representing the user's selections. User input can dispatch a corresponding action, updating the application state JSON data structure, which can keep the application state up to date with the user's current selections and can be utilized by the sentence builder for sentence construction in a first portion of the UI and for updating a second portion of the UI 202 with user selectable objects (e.g., based on further selections that a user needs to make to place an order).

The mobile device 102 can include a processor 214. The processor 214 can be used to perform instructions corresponding to the first API 206, the sentence builder 208, the translator 210, the second API 212, and the mobile application 204. The processor 214 can be a central processing unit (CPU) or other type of processing unit (e.g., field-programmable gate array (FPGA)). Through software and the processor 214, the components of the mobile device 102 can communicate to exchange information and communicate with the network 106 (e.g., using Wi-Fi or 5G).

Figure 3:
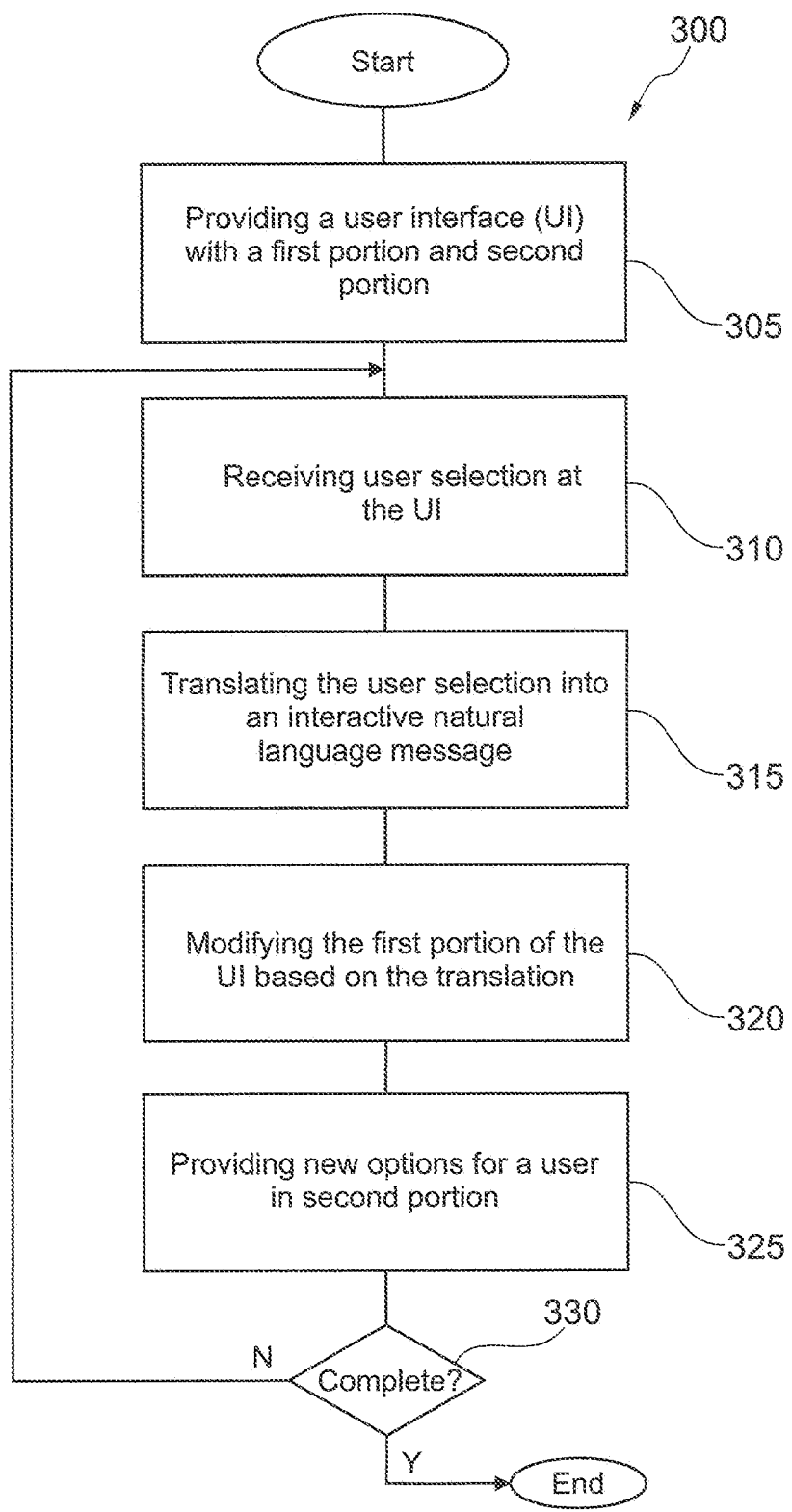
FIG. 3 is a flowchart diagram for a process to order an item with a UI that provides an interactive message regarding the order on the UI in accordance with at least one embodiment of the disclosed technology.

FIG. 3 is a flowchart diagram for a process 300 to order an item with a UI that provides a natural language message of the order on the UI. In at least one embodiment, some, or all of process 300 (or any other processes described herein, or variations and/or combinations thereof) is performed under the control of one or more mobile devices (e.g., mobile device 102) configured with computer executable instructions and is implemented as code (e.g., computer executable instructions, one or more computer programs, or one or more applications such as mobile application 204) executing collectively on one or more processors, by hardware, software, or combinations thereof. Code can be stored on a computer readable storage medium in the form of a computer program comprising a plurality of computer readable instructions executable by one or more processors. In at least one embodiment, a computer readable storage medium is a non-transitory computer readable medium. The process 300 can be code that is part of a mobile application, where a mobile device is running the mobile application by performing instructions and operations with a processor of the mobile device. The process 300 can begin with provide UI operation 305 and proceed to receive user selection operation 310.

Figure 4A:
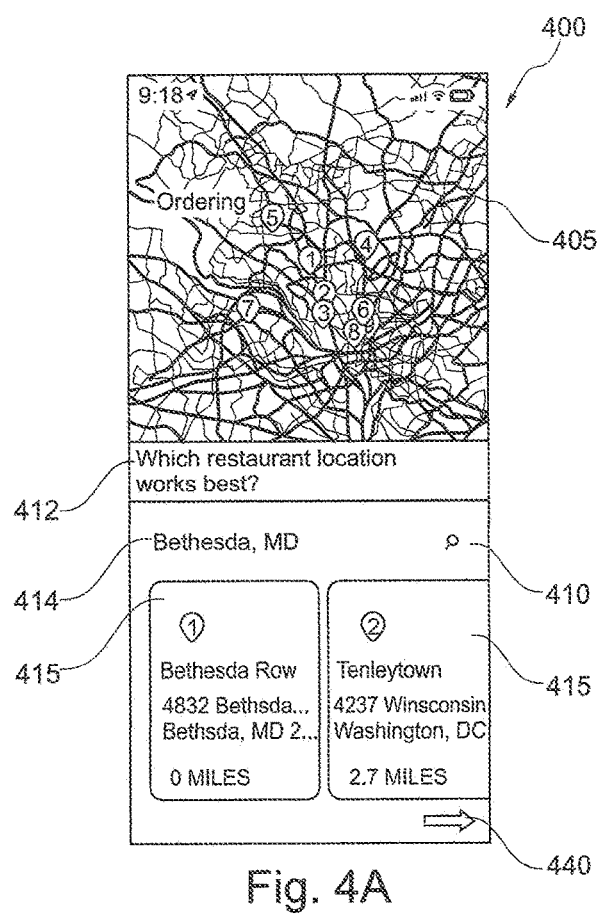

At provide UI operation 305, a mobile device provides a UI with a first portion and a second portion. The first portion can have a region to provide an interactive natural language message (e.g., edible sentence or statement, which can include words or a mix of words and emojis). The second portion can have a region that providers user with selectable objects. The provide UI operation 305 can be dynamically updated based on input from APIs, inventory databases, communicating with an application server, or other computing device involved in the food ordering process. For example, FIGS. 4A-4O show examples of a first portion 405 and a second portion 410 on UI 400.

At receive user selection operation 310, the UI can receive a user selection of a user selectable object on the UI. A user selectable object can be a choice for location, time to pick up, request for delivery, a user preference (e.g., type of food, spice level), and a component of food (e.g., grain, salad, dip, sauce, protein, size of portion, dressing, location of food, number of sides, or other preferences related to a food order). The user selectable object can include a button, window, icon, widget, slider, text box, and selectable menu object that can be toggled, selected, highlighted, and/or moved. For example, FIGS. 4A-4O show examples of user selectable objects 415. Also, as shown in FIGS. 4A-4O, a user can interact with a touchscreen displaying the UI 400 to swipe or move the objects as show by an arrow 440, e.g., in FIGS. 4D and 4N. A user can also be interactive with the UI 400 (to provide a user selection) through voice, gesture (e.g., a user can wave to indicate a selection), or movement recognition (e.g., shaking the phone can mean "reject" or "no"). For example, a user can audibly answer "yes" or "no" or shake their head to indicate "yes" or "no", and the UI 400 can update its interface based on these user inputs. Also, user selection operation 310 can include receive selection based on face recognition and movement recognition by using a trained neural network to identify a user's selection or response from a user.

At translate operation 315, based on the user selection from the receive user selection operation 310, the mobile device can perform a translation of the user's selection into an interactive natural language message (e.g., sentence or statement with words and/or emojis that a human can understand either as a native speaker or because the message is in simple and understandable symbols). In at least one embodiment, a first API can be called by the UI, and the first API can use a library of functions including a sentence builder and a translator to convert user selections into an interactive object that can be displayed on the UI. As another example, a selection of "grains" can be translated to an emoji of grains or a selection of "corn" can be translated into an emoji of corn. Also, a selection of "pick up" at an address, can be translated to an address of the food provider, where the address is underlined (e.g., to indicate that it is interactive). In at least one embodiment the functions can access database lookup tables to determine a translation of selection into an interactive message (e.g., natural language message including words in a native language for the user). In at least one embodiment, an API can call functions that use trained neural networks to identify a word, phrase, or emoji that users associate with the selection that was made and uses this information to provide a translation.

At modify operation 320, based on the translate operation 315, the mobile application modifies the UI to display or provide the information based on the translate operation 315. For example, as showing FIGS. 4A and 4B, upon selecting the store, the store's name is appended to the sentence, "Ordering from Bethesda Row." As another example, as shown in FIGS. 4D and 4E, a selection of curbside and 12:00 pm can be converted to "curbside pickup, 12:00 pm." For example, the first portion of a UI can display a user selected object into a word, phrase, or emoji that is displayed on the UI. For example, FIGS. 4D and 4E show examples of selecting a time and a car type, and those selections are displayed on the UI. More generally, in modify operation 320, the mobile application can update or revise a UI based on an output of the translation operation 315.

At provide new user selectable objects operation 325, the mobile application can provide new options for a user. After a user has made a first selection and the UI has been updated, the mobile application can perform an API to determine the next selections or options for a user's order. For example, after a user has selected a location for pickup and a burrito for an order, the mobile application can call an API to determine what ingredients options can be provided by the user to complete the food order. The mobile application can communicate with application server to receive other options for providing to a user based on inventory. The mobile application can call an API to inquire about what options can be provided after the user's first selection. In at least one embodiment, the mobile application provides the first message displaying user selections that were already made in a first portion of the UI, and the mobile application provides the next (e.g., second, third, fourth, etc.) user selectable options in the second portion of the UI, where the mobile application is calling an API to determine subsequent user selectable options for an order. As shown in FIGS. 4A-4O, the second portion of the UI 400 is updated with new user selectable options as the user builds the food order.

At complete decision operation 330, a mobile application queries a user as to whether an order is complete. In at least one embodiment, the UI displays an operation for a user to confirm an order or to pay for an order. As shown in FIG. 3, if a user confirms that an order is complete, the process 300 can end. Alternatively, if a user requests to modify an order (e.g., either by selecting an option in a first or second portion of the UI), the process 300 can return to the user selection operation 310.

Process 300 may also be interrupted, modified, or started again. For example, when meal selection is complete, tapping the order total cost button at the top of a screen presents a modal dialog with choices to add another meal or go to checkout. Either choice can perform an API call to determine or modify a current state of the order in a database.

Although not shown in process 300, the process 300 can include additional operations. The process 300 can include an operation to update the UI based on user preferences. For example, if the UI determines that a user is vegan or prefers to eat gluten free food, the process 300 can include a step to adjust the options that are provided in the UI so that it matches a user's preferences. The user's preferences can be determined from a user profile (e.g., saved in local memory on the mobile device or in a database accessible by the second API).

The process 300 can also include an import operation. The import operation can include importing the data structure corresponding to the layout of a food provider and how food is prepared or provided at the food provider. Alternatively, the import operation can include calling an API to determine the layout of a food provider and how food is prepared or provided at the food provider location (e.g., restaurant, food preparation station). This import operation can serve to provide a user with a "walk the line" experience. A walk the line experience means that choices for the order are presented in an order as if the user was present at the restaurant location and ordering food as if they were walking through the line. For example, if a user is placing an order for a burrito at a restaurant and the first part of the burrito making process includes selecting a type of tortilla, the first user selectable object presented via the UI can relate to selecting a type of tortilla. While a burrito is used in this example, the disclosed technology applies to other order types, e.g., bowls, sandwiches, salads, wraps, poke, pizza, drinks (e.g., smoothies, coffee drinks, shakes), ice cream, and the like.

In at least one embodiment, a first, second, and third selectable objects (e.g., brown rice, chicken, and black beans) are provided in the second portion of the UI in an order that corresponds to a user experience of walking through an order line at a food provider location to select ingredients or options for an order. For example, from a first display on a UI, a user starts an order by selecting a base from a list of bases for a bowl (e.g., a first user selectable object), which corresponds to the first item a user would ask for when ordering a bowl at a food provider location based on a food preparation line for preparing the bowl or a customer preparation line for ordering the bowl (e.g., a first serving area). The first user selectable item can include choosing from brown rice, white rice, or salad. After a user selects the first user selectable object, a UI updates to provide a second display with a list of proteins (e.g., a second user selectable object), which corresponds to the food preparation line for preparing the bowl having a next serving area with protein options (e.g., a second area after the first serving area). The second user selectable object can include choosing from chicken, tofu, beef, and pork. In at least one embodiment, a second user selectable object is presented by a UI in a list of user selectable objects. For example, a second user selectable object is chicken, and a UI presents the second user selectable object with user selectable objects for a protein such as beef, pork, tofu, or lamb. In at least one embodiment, a user can scroll through a list of user selectable objects on a UI, where scrolling can be horizontal or vertical, and wherein a user can perform a gesture (e.g., moving a finger on a touchscreen) to enable scrolling or otherwise modifying a UI to present or display different user selectable objects as part of a list. In at least one embodiment, a list of user selectable objects can be arranged from most popular to least popular based on user choice, where a UI called an API to determine arrangement of a list include user selectable options. For example, an API can call a data structure that stores information about a list for presenting user selectable objects (e.g., choices for meat), wherein the data structure is based on a trained neural network determine most popular and least popular user choices. As another example, a data structure can include a list of user selectable objects in an order that corresponds to how the user would select objects in a walk-the-line experience at restaurant, where options in the list are presented in an order that corresponds to an order of presentation in a food provider location (e.g., meat choices are presented in an order that corresponds to an arrangement of meat containers at a food provider location).

After receiving a selection of the second user selectable object, a UI is updated to provide a third user selectable object, which corresponds to the food preparation line for preparing the bowl having a next serving area with protein options (e.g., a third area after the second serving area). A third user selectable object can include vegetables such as chopped carrots, peas, and corn. More generally, the UI can provide options in an order for a user, where the order is the same or similar to a line or scheme followed for building a food order (e.g., burrito, sandwich, poke bowl, salad, wrap, etc.). Also, the UI can provide options in groupings. For example, a user can be presented with protein options first because protein options are first offered in a food provider location, vegetable options second because vegetable options are offered second in the food provider location, and sauces third because sauces are offered third in the food provider location when preparing an order.

The process 300 can also include a keyboard update operation. For example, the UI can include a digital keyboard and the UI can make calls to APIs to dynamically change it to include different input options (e.g., letters, emojis, symbols, images, numerals, or other graphics) based on user selections.

Also, process 300 can include performing API calls to determine selectable user objects based on neural networks that are trained on user selection data to determine popular or more likely to be desired user selectable options as compared to other user choices.

In at least one embodiment, process 300 can include providing questions or categories to a user. For example, an API can trigger the UI to display a question asking the user whether they want to "upgrade an order" or "change portion side." In such an example the process 300 can provide additional user selections for enabling a user to answer the questions.

In at least one embodiment, process 300 includes providing steps for preparing an order at a food provider location. For example, process 300 can cause a food provider device to display steps for preparing an order or cause a printer to print on paper steps for preparing an order. Process 300 can include accessing a trained neural network to determine steps for preparing the order, where the neural network was trained on a dataset that includes a food provider structural layout for ingredients and cookware at the food provider's location, distance between ingredients, conditions to prepare ingredients (e.g., time to cook, time to cut vegetables, availability of cooking devices), and data samples of a food preparer moving in the food provider location and performing steps to prepare an order (e.g., using accelerometers or image data that observes a food preparer). A dataset for training a neural network can include data from a food provider location such as input from a food preparer and machine data for machines used to prepare the food order. A trained neural network can be a convolutional neural network, a recurrent neural network, or a deep neural network.

FIGS. 4A-4O are example UIs. The UIs 400 have a first portion 405 and a second portion 410. In at least one embodiment, the first portion 405 is referred to as a "top" portion because it located in the upper half of the UI and the second portion 410 is referred to as a "bottom" portion because it is located lower half of the UI. The UI 400 can be displayed such that it covers an entire screen of a mobile device 102 (e.g., FIG. 1) or it can be displayed such that it covers less than the entire screen (e.g., touchscreen) of a mobile device. A customer or user can interact with the UI on the screen of the mobile device 102 (e.g., touchscreen, via the keyboard) to select options, toggle buttons, or otherwise engage with the UI. The UIs can include prompts 412 (e.g., questions, alerts, notices) and categories 414 for user selectable objects 415. Also, as shown in the first portion of UI 400, an interactive message 420 can be displayed. The interactive message 420 can include underlined words, bolded words, or other indications that alert the user to the fact that the interactive message 420 is interactive and a user can modify an order by interacting with the interactive message (e.g., editing a sentence that summarizes a user's order can change the order concurrently). In some embodiments, the interactive message 420 is an editable sentence, wherein the user can edit the sentence, which results in the user's order being edited concurrently or the user being presented with options based on edits to the sentence. The interactive message 420 can include user modifiable objects. The user modifiable objects can be word, words, emoji, or other image included in the interactive message 420, where a user can modify (e.g., delete, remove) the user modifiable object. By modifying the user modifiable object, the first API 206 can call the sentence builder and/or the translator to modify (e.g., edit) the interactive message 420 (e.g., the sentence).

The UIs can also include a payment total display 430 (e.g., FIG. 4K) and an expanded menu option 435. The expanded menu option 435 can be a button that users select to see additional options choices. Users can interface with UI 400 is several ways. For example, users can move items or by swiping in a direction as shown by arrow 440.

FIG. 4A is an example of an initial screen. In at least one embodiment, prior to providing the UI 400 in FIG. 4A, a mobile application can initiate an ordering process with a "splash" screen. For example, the user starts an order by tapping "start new order" at the bottom of the splash screen. After the splash screen, the UI 400 can provide a sentence builder component in the first portion 405 (e.g., top half) of the screen with a map underlayment and the start of a sentence with the word "Ordering." The second portion 410 (e.g., bottom half) of the screen allows for the selection of a store based on the user's geolocation (if enabled on the device) or by entering a city to present a list of stores. Using the geolocation or city selection, the application calls the API to retrieve a list of stores specific to the user's requested location. A UI 400 can present stores in a horizontally scrollable display component in the second portion 410 (e.g., bottom half) of the UI 400.

Figure 4B:
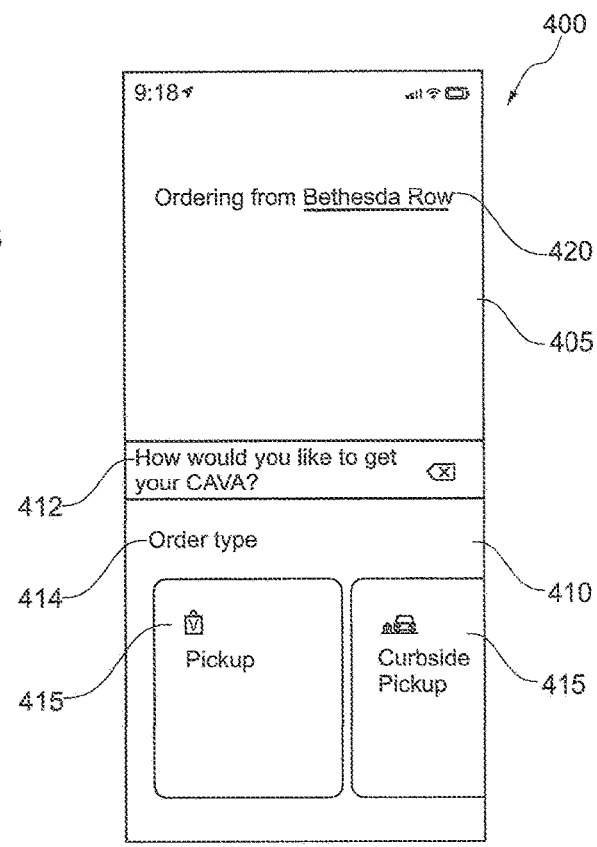
Figures 4E, 4F:
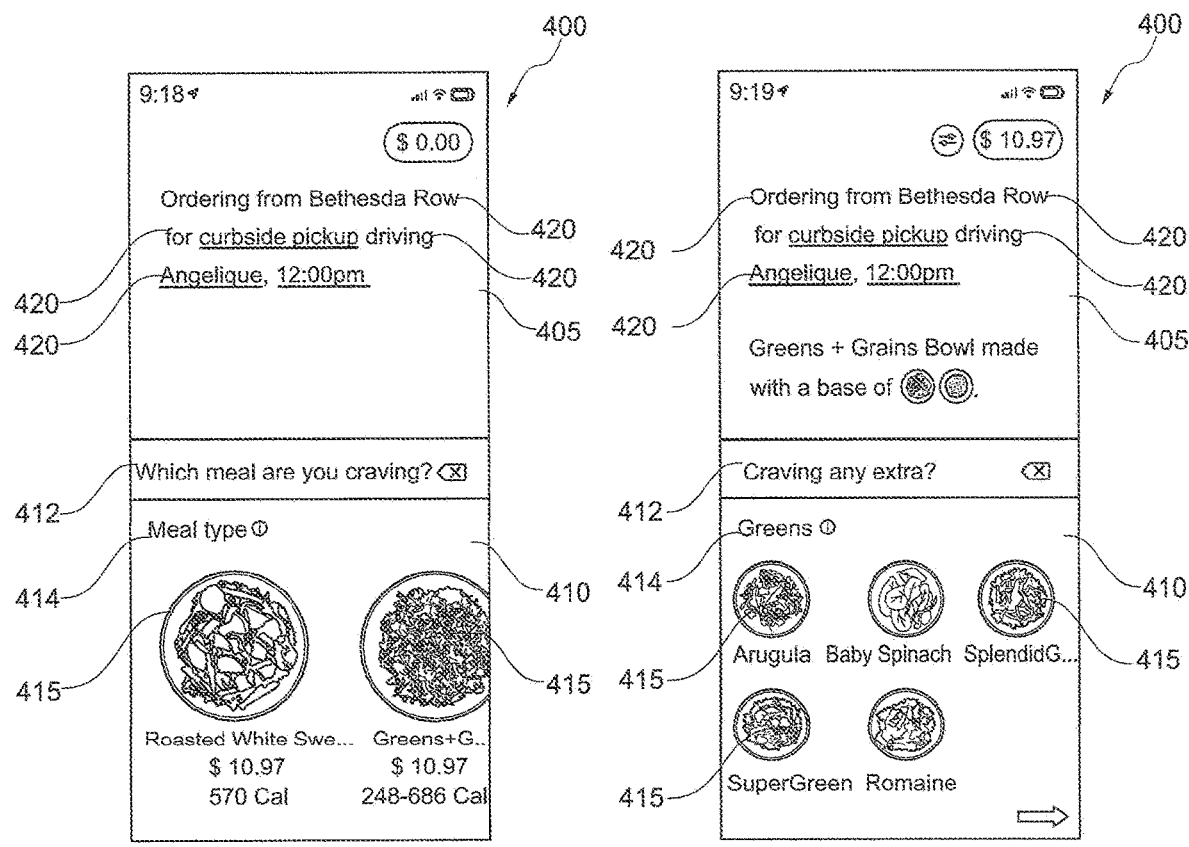
Figures 4K, 4L:
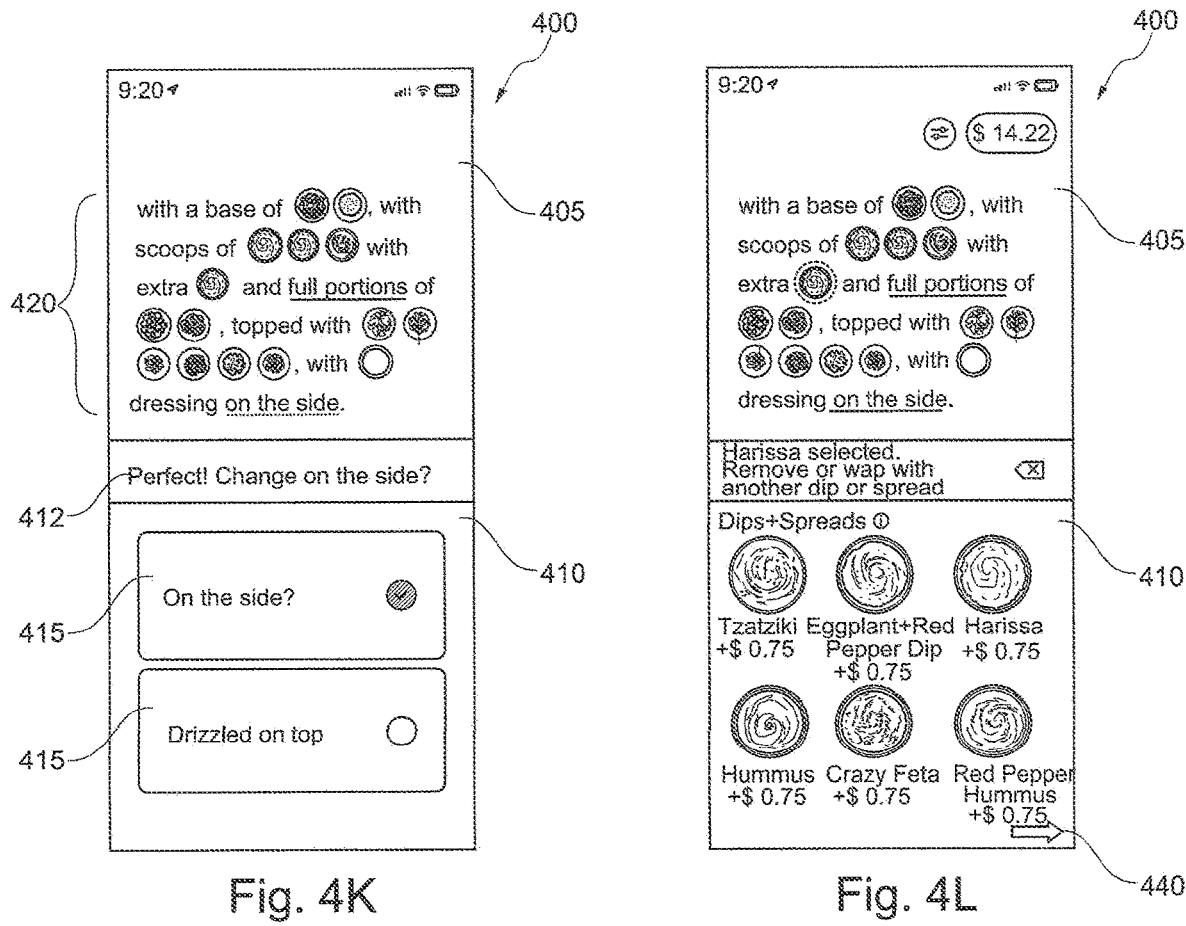
Figure 4O:
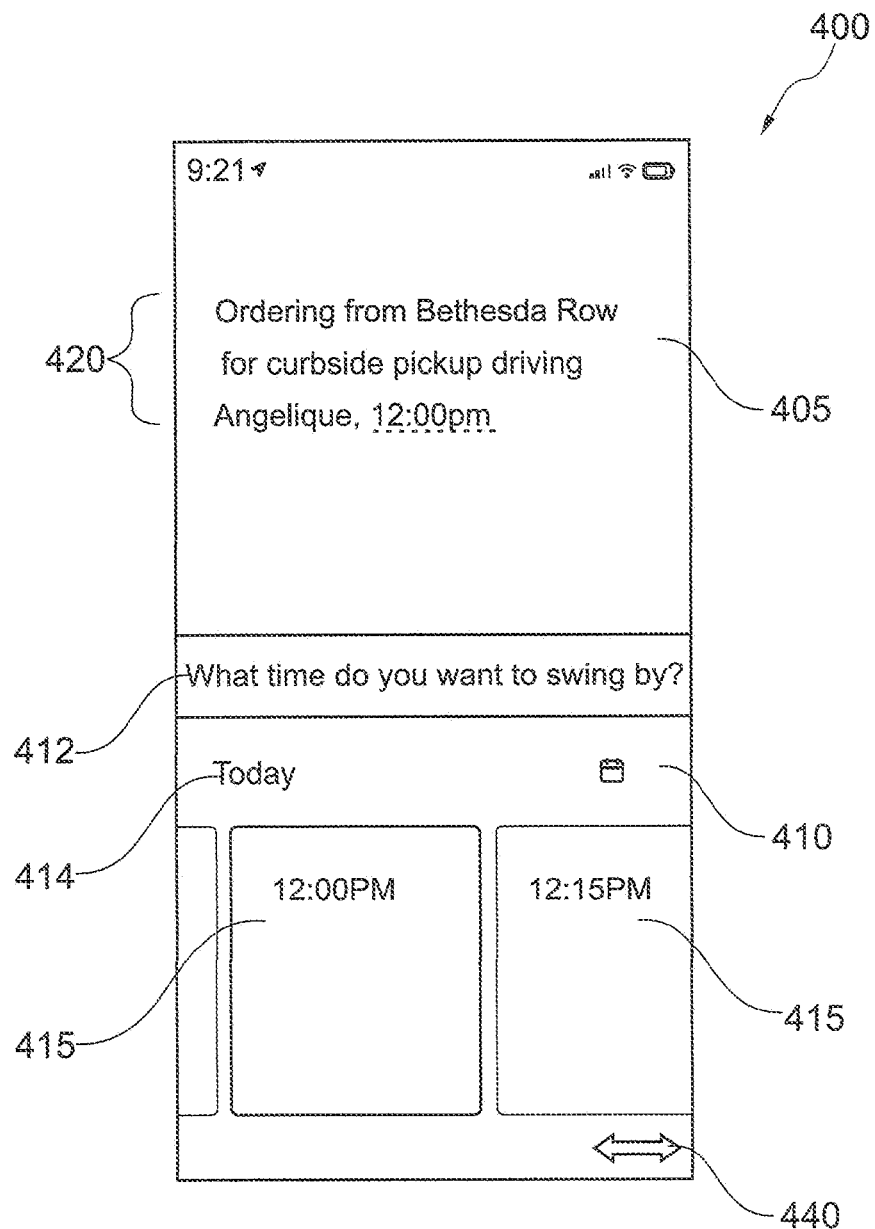

As shown in FIG. 4B, the UI 400 can provide a user selectable objects 415 in the second portion 410 such that a user can horizontally scroll through them. In FIG. 4B, the user selectable objects 415 relate to order types including pickup, curbside pickup, and delivery (not shown in FIG. 4B, but a user can horizontally scroll to the right in second portion 410 to find it). If the user selects pickup order type, the interactive message 420 sentence is appended to and reads "Ordering from Bethesda Row for pickup" as shown in FIGS. 4B and 4C. If the user selects delivery order type, the user can select from a previously saved address (e.g., authenticated users can save delivery addresses) or enter a new one. Once delivery address is entered or selected, the sentence is updated to read "Ordering for delivery to [user entered address]." As shown in FIG. 4C, if the user selects curbside pickup, the UI makes an API call to a sentence builder, and the UI is updated to read "Ordering from Bethesda Row for curbside pickup." (See FIG. 4C). In FIG. 4C "Ordering from Bethesda Row for curbside pickup" is the interactive message 420, and it includes user modifiable objects "Bethesda Row" and "curbside pickup", which the user can delete or modify such that the interactive message 420 will be revised, the corresponding order will be revised, and the second portion 410 of the UI 400 will present user selectable objects 415 based on the modified or edited interactive message 420. Also, FIG. 4C illustrates a user selectable object 415 in the second portion 410 of the UI 400 that indicates a user can choose a curbside pickup and identify the vehicle used for the curbside pickup. See prompt 412 that has a query or prompt that indicates "Choose a curbside pickup vehicle." For example, an API call is made to retrieve previously saved vehicles allowing the user to select a specific vehicle (saved vehicles can be uniquely named by authenticated users for later reference and selection) or the user can add a vehicle by selecting vehicle type and color. If a named vehicle is not selected, the vehicle details are used in the sentence, "Ordering from Bethesda Row for curbside pickup driving a [Color and Vehicle Type (e.g., Blue Coupe)]." If a saved vehicle is used, the sentence is updated to read "Ordering from Bethesda Row for curbside pickup driving [saved vehicle name (e.g., Angelique)]."

As shown in FIGS. 4D and 4E, for a curbside pickup order type, the interactive message 420 has been updated to show "Angelique" as the vehicle for curbside pickup. With the vehicle selected, a horizontally scrollable time selection component replaces the vehicles component allowing the user to select a pickup or delivery time. See FIG. 4D. When the user selects a time slot, the sentence is updated with the user's selected time, "Ordering from Bethesda Row for curbside pickup driving Angelique, 12:00 pm." See FIG. 4E.

With time slot selected, the time selection corresponds to a user selectable object 415 is replaced (or updated) with the horizontally scrollable menu item user selection objects 415 as shown in FIG. 4E (e.g., "Roasted White Swe or Greens+ G"). As the user selects the menu items to add to the order, an API updates the interactive message 420 with the selected menu items, allowing the user to modify or remove ingredients by tapping an emoji, modify portion size and dressing preference by tapping text as shown in in FIGS. 4E-4N. A user can be presented with user selectable objects 415 other than menu options such as location of a side (See FIG. 4K) and an option to add a drink or different food item (see FIG. 4N). Also, UI 400 can provide a final payment screen or checkout screen as shown in FIG. 4O. As the user selects different user selectable objects 415 to build an order and interactive message 420 updates, the prompt 412 and categories 414 can be updated using API calls.

As shown in FIGS. 4M-4O, the interactive message 420 is vertically scrollable allowing the user to scroll the interactive message 420 to view or modify items (e.g., as the user builds an order and the corresponding sentence for the order increases in length). The following is an interactive message 420 (underlines and { } represent user selectable inputs):
"Ordering from Bethesda Row for curbside pickup driving Angelique, 12:00 pm.
Green+Grains Bowl made with a base of {Arugula emoji} {Brown Rice emoji} with extra {Black Lentils emoji} with a scoop of {Tzatziki emoji} and half portions of {Grilled Chicken emoji} {Roasted Vegetables emoji}, topped with {Crumbled Feta emoji} {Avocado emoji}, with {Garlic Dressing emoji} dressing on the side. Sides with my free {Side Pita emoji}."

In various embodiments, a UI that provides a first portion with a natural language interactive message can include a mobile application that is presented on a smartphone of a user, which can be used as described herein. However, other embodiments can include interfaces, apps, or the like, presented on any suitable user device such as a laptop computer, tablet computer, gaming device, television, wearable device, virtual reality device, augmented reality device, or the like. Additionally, various embodiments can include a plurality of user devices that can communicate with one or more servers or systems to prepare and execute orders as discussed herein, with such user devices communicating with such one or more servers or systems via various suitable wired and/or wireless networks including, Wi-Fi, the Internet, a Local Area Network (LAN), a Wide Area Network (WAN), and the like.

Additionally, while various examples discussed herein relate to food and ordering of food, it should be clear that the present disclosure of a sentence builder and the like can be applicable to ordering of any suitable type of products. Additionally, in some embodiments, a sentence builder can be used in non-ordering applications. Accordingly, the present disclosure should not be construed to be limiting on the wide variety of embodiments that are within the scope and spirit of the present disclosure.

The described embodiments are susceptible to various modifications and alternative forms, and specific examples thereof have been shown in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

What is claimed is:

1. A computer-implemented method, the method comprising:
   providing, by an application programming interface (API), a user interface (UI) that includes a first portion and a second portion;
   providing, by the API, a first user selectable object in the second portion of the UI;
   receiving, from the UI, a first user selection of the first user selectable object;
   in response to receiving the first user selection, translating the first user selection into an interactive first message by performing a call for the API and providing the interactive first message in the first portion of the UI, wherein the interactive first message includes a first user modifiable object;
   in response to receiving the first user selection, providing a second user selectable object in the second portion of the UI;
   receiving, from the UI, a second user selection of the second user selectable object;
   in response to receiving the second user selection, translating the second user selection into an interactive second message by performing a call for the API and providing the interactive first message and the interactive second message in the first portion of the UI, wherein the interactive second message includes a second user modifiable object;
   receiving, from the UI, a first user edit corresponding to modifying the first user modifiable object or the second user modifiable object; and
   in response to receiving the first user edit, modifying the first or second interactive messages in the first portion of the UI and modifying the first or second user selectable objects in the second portion of the UI.

2. The computer-implemented method of claim 1, wherein translating further comprises calling the API and causing it to access a library that includes functions to determine a translation of the first or second user selections into a first word, first phrase, second word, second phrase, symbol, or emoji.

3. The computer-implemented method of claim 1, wherein the first and second user selectable objects are a button, window, icon, widget, slider, text box, or selectable menu item.

4. The computer-implemented method of claim 3, the method further comprising:
   in response to receiving the second user selection, providing a third user selectable object in the second portion of the UI,
   wherein the first, second, and third user selectable objects correspond to food items or food order preferences,
   wherein content of the second user selectable object depends on the first user selection and content of the third user selectable object depends on the second user selection, and
   wherein the first, second, and third user selectable objects are provided to a user in an order that corresponds to an order in which the first, second, and third user selectable objects appear in a food production line.

5. The computer-implemented method of claim 4, the method further comprising:

modifying the first, second, and third user selectable objects by using an API call to access a user profile or an inventory database, wherein the user profile includes information related to a user preference for food and wherein the inventory database is a dynamically updated database corresponding to availability of food in a food provider location.

6. The computer-implemented method of claim 1, wherein the API is written in a single code base.

7. The computer-implemented method of claim 1, wherein the first and second user modifiable objects are text with underlining, text with highlighting, an emoji, an image, a word, or phrase.

8. A non-transitory computer-readable medium storing instructions, which when executed by a processor, cause a processor to perform operations, the operations comprising:

providing, by an application programming interface (API), a user interface (UI) that includes a first portion and a second portion;

providing, by the API, a first user selectable object in the second portion of the UI;

receiving, from the UI, a first user selection of the first user selectable object;

in response to receiving the first user selection, translating the first user selection into an interactive first message by the API and displaying the interactive first message in the first portion of the UI, wherein the interactive first message includes a first user modifiable object;

in response to receiving the first user selection, displaying a second user selectable object in the second portion of the UI, wherein content of the second user selectable object depends on the first user selection;

receiving, from the UI, a second user selection of the second user selectable object;

in response to receiving the second user selection, translating the second user selection into an interactive second message by the API and displaying the interactive first message and the second interactive message in the first portion of the UI;

transmitting a request to place a food order corresponding to the first and second interactive messages; and providing, at food provider location, steps for preparing the food order, wherein the steps are based on a dataset that determines instructions and a path for preparing the food order.

9. The non-transitory computer-readable medium of claim 8, wherein the first and second interactive messages include natural language and are first and second interactive natural language messages, wherein the first and second interactive messages include a first user modifiable object and a second user modifiable object, further comprising:

receiving, from the UI, a user input corresponding to modifying the first user modifiable object or the second user modifiable object; and in response to receiving the user input, modifying the first or second interactive natural language messages in the first portion of the UI and simultaneously modifying a display of the first or second user selectable objects in the second portion of the UI.

10. The non-transitory computer-readable medium of claim 8, wherein the first and second user selectable objects correspond to a location of these items in a food producing store or inventory, and wherein the first and second user selectable objects are presented in an order that they appear in at the food producing store or in the inventory.

11. The non-transitory computer-readable medium of claim 8, wherein modifying the first and second user selectable objects by using an API call to a user profile or to an inventory database.

12. The non-transitory computer-readable medium of claim 8, wherein the first or second interactive messages refer to a time, delivery option, delivery address, location, user preference, food item, or order item, and wherein the providing the steps includes displaying on a screen of a food provider device the steps or printing the steps.

13. The non-transitory computer-readable medium of claim 8, wherein the operations further comprise:

providing the first and second user selectable objects in an order that corresponds to an order presented in a food provider location, wherein providing the first and second user selectable objects in the order includes performing an API call to determine a data structure that relates to location of food items in the food provider location.

14. The non-transitory computer-readable medium of claim 8, wherein the operations further comprise:

in response to receiving user input, modifying the first user selectable object by using an API call.

15. A computer-implemented method, the method comprising:

displaying a user interface (UI) that includes a first portion and a second portion;

providing a first user selectable object in the second portion of the UI;

receiving a first user selection of the first user selectable object;

in response to receiving the first user selection, translating the first user selection into an editable first message and displaying the editable first message in the first portion of the UI, in response to receiving the first user selection, displaying a second user selectable object in the second portion of the UI;

receiving a second user selection of the second user selectable object; and in response to receiving the second user selection, translating the second user selection into an editable second message and displaying the editable first message and the editable second message in the first portion of the UI to form a combined message.

16. The computer-implemented method of claim 15, wherein the first user selectable object is associated with a global menu, wherein the second user selectable object corresponds to a local menu, wherein the second user selectable object is provided as one object in a list of user selectable objects, and wherein the list is modifiable based on receiving a scrolling gesture from a user.

17. The computer-implemented method of claim 15, wherein translating the first and second user selectable objects is performed by calling an API, and wherein content of the second user selectable object is at least partially based on content of the first user selectable object.

18. The computer-implemented method of claim 17, further comprising:

providing a keyboard on the UI; and modifying the keyboard based on the first and second user selectable objects.

19. The computer-implemented method of claim 17, the method further comprising:

providing a third selectable object in the second portion of the UI, wherein the first, second, and third selectable objects are provided in the second portion in an order that corresponds to a user experience of a walking through an order line at a food provider location to determine ingredients or options for an order.

20. The computer-implemented method of claim 15, wherein the first editable message includes symbols corresponding to food, emojis, or images, and wherein the combined message is a sentence.

21. The computer-implemented method of claim 15, wherein the first and second editable messages are first and second interactive natural language messages and include natural language, the method further comprising:
   receiving an input from a user to select user modifiable objects.

* * * * *